April 9, 1968     J. G. HULETT     3,376,661
MULTIPLE COMPANY CREDIT CARD
Filed June 28, 1966
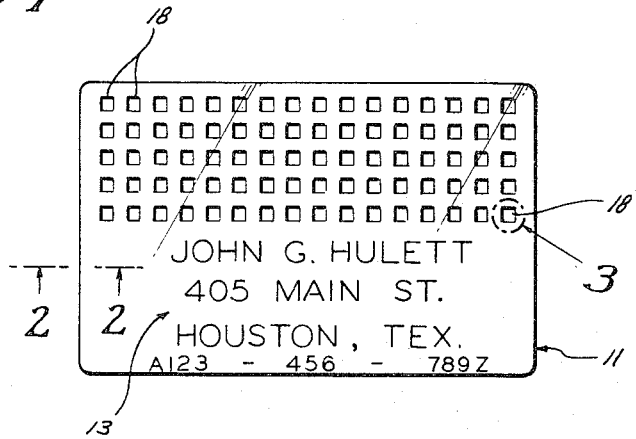
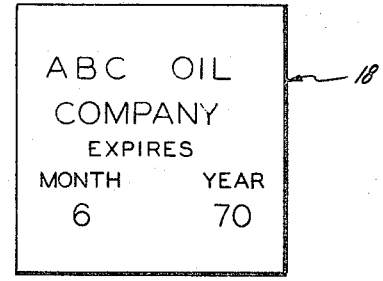
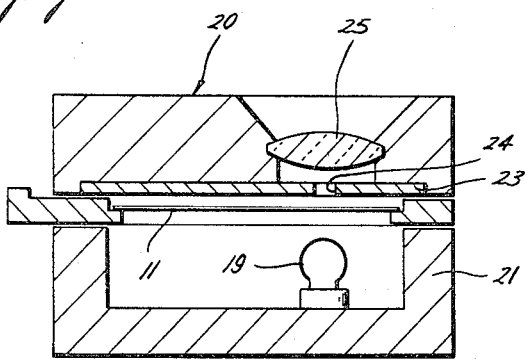
John G. Hulett
INVENTOR.
BY Lee R. Larkin
ATTORNEYS 3,376,661
MULTIPLE COMPANY CREDIT CARD
John G. Hulett, Rte. 1, Box 488, Pearland, Tex. 77581
Filed June 28, 1966, Ser. No. 561,170
3 Claims. (Cl. 40—2.2)

ABSTRACT OF THE DISCLOSURE

A multiple company credit card and system for use in receiving credit from a plurality of different creditor companies. The cards are provided with the card holder's identity on one portion thereof with another portion having a predetermined pattern of creditor indicia, with each indicia identifying a different creditor and occupying a predetermined position in the pattern. The system also includes read-out means arranged to receive a card and to sense and display a predetermined one of the indicia.

---

This invention relates to a multiple company credit card for use in receiving credit from a plurality of different creditor companies. More particularly, this invention relates to a credit card and method for making it, which card may be used by the holder thereof to receive credit from a plurality of creditor companies, thereby eliminating the need to carry a plurality of separate credit cards.

Normally, when an individual desires to obtain credit from a creditor company, he is asked to fill out a form which requires such information as his name, address, financial means, background credit record, credit references and the like. If the creditor company determines that the applicant meets the required standards for the granting of credit, then the creditor company issues a credit card which is typically an embossed plastic card. This card normally contains the company trademark or trade name, which may be referred to hereinafter as the company "indicia." In addition, the card will be embossed with an account number for that individual, as well as his name, address and date of expiration.

The card is thereafter used by the card holder in making a purchase at one of the creditor companies' establishment by presenting the card to that establishment. The clerk of the establishment will normally prepare a slip showing the amount of the purchase, the item that is purchased, and the date therefor, etc. The credit card and the slip are thereafter placed in a machine where pressure is applied thereto, whereby the embossed data on the card is printed on the slip, as well as any carbons which may be attached thereto. Normally, the customer receives one copy and one or more copies are then sent to the accounting office of the creditor company.

In the accounting office of the creditor company, optical and/or magnetic reading means may be used to extract the recorded data from the credit slip, which will later be used in automatic data processing equipment to prepare a monthly statement for the customer or debtor. The customer receives a monthly statement from the firm along with a copy of each credit slip recording each transaction.

The credit card holder can then verify his signature on the credit slips to determine whether or not his monthly statement is correct, and can thereafter make payment by check or the like.

It is therefore obvious that the customer or credit card holder must carry with him a plurality of different credit cards to receive credit from a plurality of creditor companies. As the number of such credit cards multiplies, it becomes burdensome to carry them or otherwise have them available.

It is therefore a purpose of this invention to provide in a single credit card all of the present capabilities which exist or inure to a customer who has established credit with a plurality of creditor companies and using a plurality of credit cards.

Briefly stated, the credit card of this invention is a multiple company credit card for use in receiving credit from a plurality of different creditor companies. The card comprises a thin, generally rectangular wallet size front card of transparent material having the card holder's name and account number embossed on one side thereof and covering only a part of the surface area thereof. There is a thin microfilm type layer bonded to the other side of the rectangular card, with said layer having a plurality of different creditor company indicia printed thereon, which indicia cover an area spaced apart from the embossed area of the card.

The method of this invention provides a means for making a multiple company credit card for use in receiving credit from a plurality of different creditors, and comprises the steps of embossing the name and address of the card holder on one side of a transparent wallet size card and adjacent to one edge thereof. In addition, the card is then bonded to a generally transparent microfilm type layer of material of the same general planar dimensions having a plurality of individual creditor company indicia printed thereon along the side generally opposite from said embossed area of said card, each indicia having a unique position thereon. It is to be understood that the term "indicia" is used to denote a creditor company trademark, trade name or the like which is used to identify a particular company and will normally include expiration date of the line of credit for that company.

Reference to the drawing will further explain the invention wherein like numerals refer to like parts and in which:

FIG. 1 is a top planned view of a credit card embodying the present invention and made in accordance with the method of this invention.

FIG. 2 is a cross-section taken generally along line 2—2 of FIG. 1 showing the laminated structure of the card.

FIG. 3 is an enlarged creditor company indicia taken from the position shown by the numeral 3 on FIG. 1.

FIG. 4 is a diagrammatic illustration of a light box and the magnifying device which can be used to read the indicia shown in FIG. 3.

Referring now to FIG. 1, the multiple company credit card of this invention is generally shown by the numeral 11 and is generally rectangular in plan view and generally of wallet size. It is comprised of a top or front card or layer 12 of generally transparent material and is provided with embossed data generally shown by the numeral 13, which is adjacent to one edge of the card and generally covers about one-half of the surface area thereof and includes the name, address and account number of the card holder.

Top layer 12 has bonded thereto a microfilm type layer 14 which in turn has bonded thereto another back or bottom layer 15, also of translucent material similar to that used in top layer 12. Layers 12, 14 and 15 may be bonded together by any cementing materials or may be of a thermoplastic material such that they may be bonded by heating.

Microfilm type layer 14 is unique in that it has a plurality of individual creditor company indicia printed thereon in the form of squares 18, one of which is shown in enlarged condition in FIGURE 3. Ordinarily a square 18 might have a dimension of one-tenth inch by one-tenth inch, for example, and might include as the creditor company indicia, the name of the company as well as the expiration date of the line of credit from that company as shown in FIGURE 3.

Thus, it can be seen that layer 14 can have imprinted thereon the indicia of a large number of creditor companies which have extended the holder of the card a line of credit. In addition, each of the indicia can show the expiration date of the line of credit. Because the indicia have been reduced to a very small size by the microfilm type layer, it is thus possible to include almost an infinite number of such indicia on one card. The indicia on layer 14 are spaced apart from the embossed area on front layer 12 so that the embossed name, address, and account number will not mask the creditor company indicia.

The size of the credit card 11 shown in FIG. 1 is selected such that it will fit existing credit card machines. However, since the indicia of the various creditor companies is in miniature and cannot easily be seen by the naked eye, there is provided a card viewing box for use in connection with the credit card of this invention, which box includes light 19 mounted in light box 21 having mounted therein a generally rectangular sliding tray 22 which is adapted to receive therein credit card 11, which is held below mask 23 which has an appropriate aperture 24 therein with magnifying glass 25 supported thereabove.

With card 11 held in the card viewing box 20 as shown in FIG. 4, the clerk operating the same can easily view the indicia contained in card 11 to determine the expiration date of the line of credit for that particular company. An optical gain of perhaps 20 times is sufficient to provide adequate viewing of the miniature indicia on card 11.

It is to be understood that tray 22 would be adapted to hold the card 11 in a unique position with respect to aperture 24 such that the creditor company indicia for the company which is then granting credit would come into view upon the passing of tray 22 to the position shown in FIGURE 4. In other words, each indicia for each creditor company would have a unique position on credit card 11. For example, the various positions of indicia on the card shown in FIGURE 1 could be numbered by rows both vertically and horizontally and assigned a number, which number would be reserved for one particular creditor company only. Thus, by having the sliding tray 22 indexed to show only one particular creditor company's indicia it could be readily ascertained whether or not the card holder was granted a line of credit from that company. The operator of card viewer 20 could easily ascertain by properly indexing slide tray 22 to view only the indicia for his company and thereby determine whether or not the credit card holder had a line of credit, in which event the clerk could thereafter use the credit card in the usual manner by filling out a sales ticket or credit slip and using the card to imprint the card holder's name and account number thereon, thereby completing the transaction.

It will be recognized that the account number of the card holder with each firm will be the same. However, this presents no problem since each of the companies maintains separate accounting systems.

As an alternate, it is possible to include the account number with the indicia and expiration date, but this would require the clerk to record the account number on the sales slip rather than having it printed thereon by the embossed number.

From the foregoing description it can be seen that every person who has a line of credit for one or more companies and therefore has a plurality of credit cards, can use one credit card of this invention as a replacement therefor, thereby making the use of credit more convenient and eliminating the need for a plurality of different credit cards. It is to be understood that other indicia might also be included in the microfilm type layer 14, such as the card holder's signature, his social security number or his picture, all of which could then be viewed in the card viewer 20 by the addition of appropriate apertures 24 and magnifying glasses 25.

Further modifications may be made in the invention as described without departing from the scope of the invention. Accordingly, the foregoing description is to be construed as illustrative only and is not to be construed as a limitation upon the invention as defined in the following claims.

What is claimed is:

1. A multiple company credit card for use in receiving credit from a plurality of different creditor companies, comprising:
   a generally rectilinear translucent card having the card holder's identity embossed on one portion thereof;
   and a grid system on another portion of said card for defining a plurality of co-ordinate positions, each of said positions being assigned to a particular creditor for carrying a micro-image of said creditor's identity, whereby said creditor may be readily located.

2. A multiple company credit card for use in receiving credit from a plurality of different creditors, comprising:
   a card having the card holder's identity displayed on one portion thereof;
   and a predetermined pattern of translucent micro-images displayed on another portion of said card, each of said micro-images identifying a different creditor, and each micro-image occupying a predetermined position in said pattern, whereby each of said creditor images may be readily located.

3. In a multiple company credit card system for use by a plurality of creditors having a plurality of customer credit card holders, the combination comprising:
   a credit card having the card holder's identity displayed on one portion thereof, and having a predetermined pattern of creditor indicia on another portion thereof, each of said indicia identifying a different creditor and occupying a predetermined position in said pattern;
   and a read-out device arranged to receive said card and to sense and display a predetermined one of said indicia.

References Cited

UNITED STATES PATENTS

| 1,410,130 | 3/1922 | Sinclair | 40—158 |
| 2,842,882 | 7/1958 | Greene et al. | 40—158 |
| 3,152,901 | 10/1964 | Johnson | 283—7 X |
| 3,204,354 | 9/1965 | Berger | 40—2.2 |
| 3,313,052 | 4/1967 | Malster | 40—2.2 |

EUGENE R. CAPOZIO, *Primary Examiner.*

W. J. CONTRERAS, *Examiner.*